US007506035B1

(12) United States Patent
Lu

(10) Patent No.: US 7,506,035 B1
(45) Date of Patent: Mar. 17, 2009

(54) CONTENT-BASED ALARM CLOCK

(75) Inventor: Larry L. Lu, Great Falls, VA (US)

(73) Assignee: AOL LLC, Dulles, VA (US)

( * ) Notice: Subject to any disclaimer, the term of this patent is extended or adjusted under 35 U.S.C. 154(b) by 718 days.

(21) Appl. No.: 10/334,154

(22) Filed: Dec. 31, 2002

(51) Int. Cl.
*G06F 15/16* (2006.01)
*G04B 47/00* (2006.01)

(52) U.S. Cl. ........................................ 709/219; 368/10

(58) Field of Classification Search ................. 709/203, 709/206, 217–224; 368/10
See application file for complete search history.

(56) References Cited

U.S. PATENT DOCUMENTS 5,794,259 A * 8/1998 Kikinis ........................ 715/507
6,029,195 A * 2/2000 Herz .......................... 725/116
6,229,430 B1 5/2001 Smith Dewey
6,480,830 B1 * 11/2002 Ford et al. ..................... 705/9
6,678,215 B1 * 1/2004 Treyz et al. ................... 368/10
6,795,377 B2 * 9/2004 Gorden ........................ 368/12
6,823,263 B1 * 11/2004 Kelly et al. .................... 702/3
6,845,316 B2 * 1/2005 Yates ......................... 701/117
2001/0046852 A1 11/2001 Dorr
2002/0002039 A1 1/2002 Qureshey et al.
2002/0011923 A1 1/2002 Cunningham et al.
2002/0054080 A1 * 5/2002 Belanger et al. ............ 345/738
2002/0072326 A1 6/2002 Qureshey et al.
2002/0078818 A1 6/2002 Elliott
2002/0099550 A1 7/2002 Emerick, Jr.
2002/0103898 A1 8/2002 Moyer et al.
2002/0120778 A1 8/2002 Clapper et al.
2002/0123368 A1 * 9/2002 Yamadera et al. ........... 455/556
2002/0186618 A1 * 12/2002 Kirkpatrick .................. 368/11
2003/0001727 A1 * 1/2003 Steinmark .............. 340/309.15
2003/0027525 A1 * 2/2003 Moore et al. .................. 455/41

OTHER PUBLICATIONS

Net2Phone MAX IP10 User Guide Rev. 1.0, Oct. 2002.*

* cited by examiner

*Primary Examiner*—Yasin M Barqadle
(74) *Attorney, Agent, or Firm*—Fish & Richardson P.C.

(57) ABSTRACT

Personalized information is received at an alarm clock device by configuring the alarm clock device with an identifier for which a user identity profile has previously been established for purposes other than for configuration of the alarm clock device. Upon satisfaction of user-defined alarm criteria, the identifier is submitted. Subsequent to the submission of the identifier, information is received that is personalized to a user identity of the alarm clock device based on the user identity profile.

19 Claims, 5 Drawing Sheets

CONTENT-BASED ALARM CLOCK

TECHNICAL FIELD

This document relates to a content-based alarm clock.

BACKGROUND

Throughout the day, for example, in the morning before work or school, many people use an alarm clock or a television to receive news, weather, and traffic. Typically, users tend to suffer through an entire news segment to hear the particular content of interest. General purpose personal computers (PCs) are becoming more commonplace in homes, enabling users to obtain more directed and relevant news without delays. However, general purpose PCs tend to be more costly and bulky than conventional alarm clocks, making them less desirable for distribution throughout the home. Furthermore, the average user must modify their behavior in order to use a general purpose PC as an alarm clock and to obtain news in this fashion.

SUMMARY

In one general aspect, personalized information is received at an alarm clock device by configuring the alarm clock device with an identifier for which a user identity profile has previously been established for purposes other than for configuration of the alarm clock device. Upon satisfaction of user-defined alarm criteria, the identifier is submitted. Subsequent to the submission of the identifier, information is received that is personalized to a user identity of the alarm clock device based on the user identity profile.

Implementations may include one or more of the following features. For example, the user-defined alarm criteria may be established. The personalized information may be received based on only the submission of the identifier upon or before satisfaction of the user-defined alarm criteria. The personalized information may be received without the user identity having to configure the user identity profile for the purpose of configuring the alarm clock device.

The user-defined alarm criteria may be established by designating a time value to submit the identifier. A client system may be coupled to the alarm clock device and used to configure the alarm clock device with the identifier, to establish the user-defined alarm criteria, and upon satisfaction of the user-defined alarm criteria to submit the identifier. The alarm clock device may be a special purpose computer configured to provide alarm clock services including alarm capabilities and audible or visual display of personalized news, weather, and entertainment information.

The personalized information received may include weather information, traffic information, and/or news information that is personalized for the user identity based on demographic data contained in the user identity profile.

In another general aspect, personalized information is received at an alarm clock device by submitting an alarm clock device identifier over a communication network to a remote system for association with a user identity profile established for purposes other than for configuration of the alarm clock device upon satisfaction of user-defined alarm criteria. Subsequent to the submission of the identifier, information personalized to a user identity of the alarm clock device based on the user identity profile is received.

Implementations may include one or more of the following features. For example, the personalized information may be received based on only the submission of the alarm clock device identifier upon or before satisfaction of the user-defined alarm criteria. The personalized information may be received without the user identity having to configure the user identity profile for the purpose of configuring the alarm clock device.

The user-defined alarm criteria may include a time value to submit the alarm clock device identifier. A client system may be coupled to the alarm clock device and may be used to submit the alarm clock device identifier.

The alarm clock device may include a special purpose computer configured to provide alarm clock services including alarm capabilities and audible or visual display of personalized news, weather, and entertainment information.

The personalized information received may include weather information, traffic information, and/or news information that is personalized for the user identity based on demographic data contained in the user identity profile.

In another general aspect, an alarm clock includes an input to enable a user identity to set an alarm condition and a time value associated with the alarm condition, an identifier to associate the alarm clock with a user identity profile previously created and maintained for a purpose other than to use with the alarm clock, an interface to enable communications between the alarm clock and a communication network and through receipt of information from a data source remote to the alarm clock, wherein the information received from the data source is based on preexisting demographic data maintained about the user identity in the user identity profile, a display to display the time value, a speaker to play an audio signal from an audio source, to play an audio signal related to the set alarm condition, and to play information received from the data source based on the user identity, and a processor operable to control access to the data source over the communication network.

Implementations may include one or more of the following features. For example, the alarm clock may include a special purpose computer configured to provide audible or visual display of personalized information without the user identity having to configure the user profile for the purpose of enabling receipt of the personalized information. The alarm clock may include a special purpose computer configured to provide audible or visual display of personalized information based only on the submission of the identifier to the data source. The alarm clock may include a special purpose computer configured to provide alarm clock services including alarm capabilities and audible or visual display of personalized news, weather, and entertainment information.

The interface may be coupled to the communication network using a wired and/or wireless connection. The interface may include a telephony modem and/or a cable modem. The input may include voice activated commands. The data source may include a web server.

The information received from the data source may include traffic information, weather information, and/or news information that is personalized for the user identity based on preconfigured demographic data.

The identifier may be associated with the user identity profile to enable receipt of personalized information at the alarm clock based on information contained within the user identity profile. The input may be used to set the alarm condition to request personalized information at a designated time value for a user identity and the processor may be configured to enable the alarm clock to request the personalized information at the designated time value that includes information about the user identity to enable identification of the user identity. The identifier may include a device identifier and/or a user identity identifier.

In another general aspect, an apparatus includes an input to enable receiving a request for information from an alarm clock device over a communication network, wherein the request for the information includes an identifier to enable the alarm clock device to be associated with a preexisting user identity profile, a processor to enable accessing the preexisting user identity profile that contains demographic data for a user identity that was previously created and maintained for a purpose other than to use with the alarm clock device and to determine personalized information to provide in response to the request based on the demographic data contained in the preexisting user identity profile, and an output to enable communicating the personalized information to the alarm clock device over the communication network in response to the request received from the alarm clock device.

Implementations may include one or more of the following features. For example, the communication network may include the Internet. The input, the processor, and the output may be included in a web server. The input may receive a request for information from the alarm clock device to be delivered at a designated time value and the output may communicate the personalized information to the alarm clock device at the designated time value.

The apparatus may include a storage module to store the preexisting user identity profile. The preexisting user identity profile may be stored remote from the apparatus. The identifier may include a screen name to enable the alarm clock device to be associated with the preexisting user identity profile. The identifier may include a device number that is associated with the preexisting user identity profile.

The requested information may include traffic information, weather information, and/or news information that is personalized for a user identity based on the preexisting user identity profile.

In another general aspect, information is provided to an alarm clock device by receiving a request for information for an alarm clock device over a communication network that includes an identifier to enable the alarm clock device to be associated with a preexisting user identity profile. The preexisting user identity profile that contains demographic data for a user identity that was created and maintained for a purpose other than to use with the alarm clock device may be accessed. The information to provide may be determined based on the preexisting user identity profile. The information may be sent to the alarm clock device over the communication network.

Implementations may include one or more of the following features. For example, the information may be sent at a designated time value. The request for the information may be received from the alarm clock device. The request for the information for the alarm clock device may be received from a client system.

The request for the information may be received over the Internet and the information may be sent to the alarm clock device over the Internet.

These general and specific aspects may be implemented using a system, a method, or a computer program, or any combination of systems, methods, and computer programs.

Other features will be apparent from the description and drawings, and from the claims.

For brevity, several elements in the figures described below are represented as monolithic entities. However, as would be understood by one skilled in the art, these elements each may include numerous interconnected computers and components designed to perform a set of specified operations and/or may be dedicated to a particular geographical region. Like reference symbols in the various drawings indicate like elements.

DETAILED DESCRIPTION

A content-based alarm clock is coupled to a communication network to receive content that is tailored to a user based on a preexisting profile for the user. The alarm clock may access and receive relevant content, such as traffic, weather, and news, that is selected based on a user profile that is maintained by an Internet service provider (ISP), or otherwise. For example, a preexisting user profile may contain information that indicates the user's residential address and business address. The residential address and the business address information from the user profile may be used to determine the particular traffic information (e.g., traffic delays, accidents, road construction) for the possible driving and public transportation routes specific to that user. In this manner, existing information known about the user may be leveraged to deliver relevant content to the alarm clock.

Figure 1:
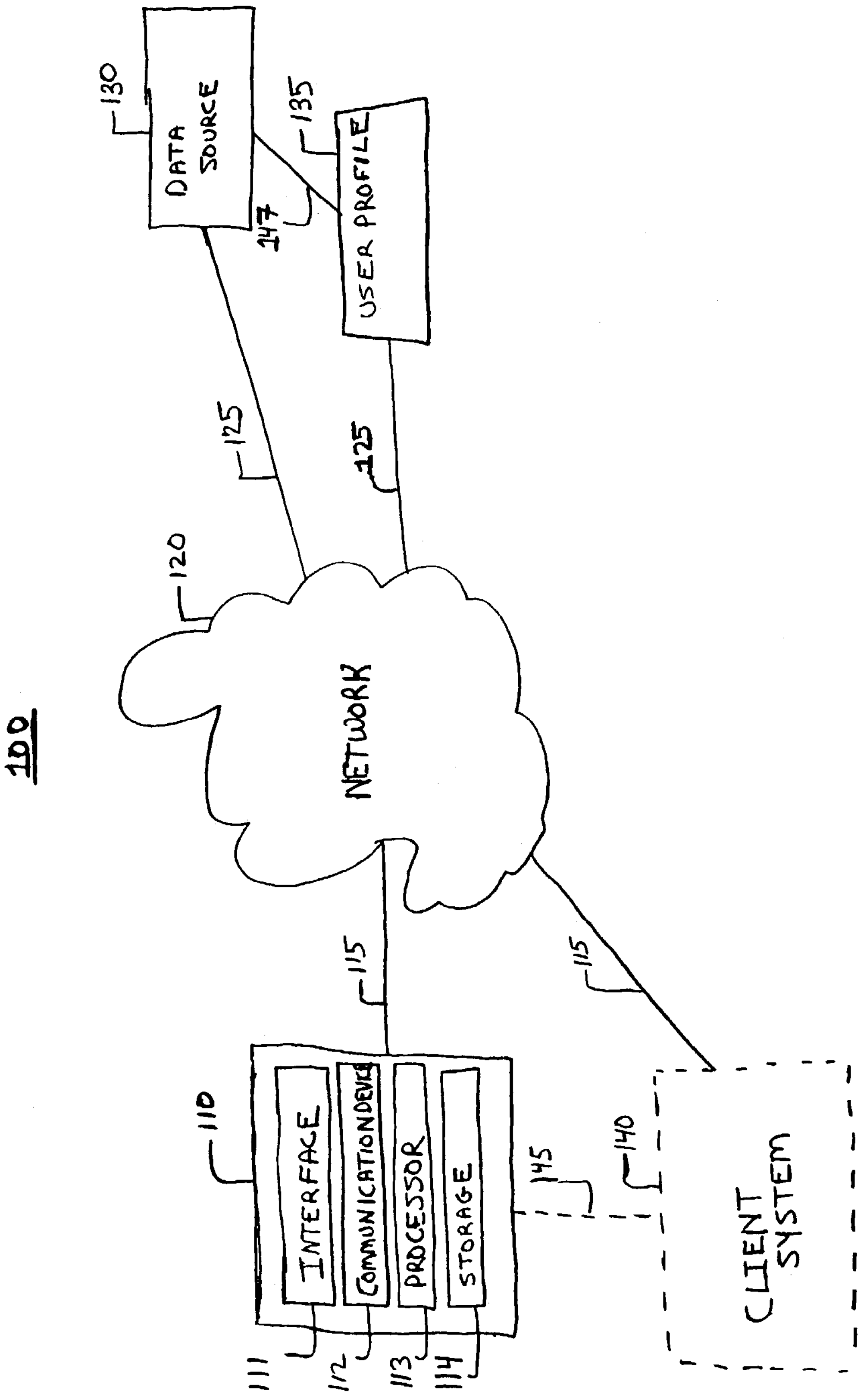
FIG. 1 is a block diagram illustrating a communication system with a content-based alarm clock coupled to a communication network.

Referring to FIG. 1, a communications system 100 includes an alarm clock (clock) 110, communication links 115, 125, 145, and 147, a communication network 120, a data source 130, a user profile 135, and an optional client system 140. Communication system 100 is structured to enable data to be transferred through the communication networks 120 and 145 between clock 110 and client system 140 and data source 130. The clock 110 and the client system 140 are coupled to the communication network 120 through communication links 115, and the clock 110 and the client system 140 are coupled to each other through communication links 120 and 145. The data source 130 and the user profile 135 are coupled to the communication network 120 through communication links 125 and also are coupled to each other through communication link 147.

Clock 110 may include one or more hardware and software modules, which may be programmed to execute instructions in a defined manner. In one exemplary implementation, clock 110 may be an Internet-type appliance that directly connects to communication network 120 to receive content. Additionally or alternatively, clock 110 may be included as a part of a client system 140 through which the content is received from the communication network 120. Clock 110 may include hardware and/or software components to function as a radio tuner, an alarm clock, and a music player (e.g., a cassette player, a compact disc (CD) player, a digital versatile disc (DVD) player, and/or an MPEG Audio Layer-3 (MP3) player).

Clock 110 also functions to communicate with an external data source to receive content from the data source over the communications network 120. However, clock 110 typically is a special purpose computer configured to enable access to content personalized according to a user profile of the operator, as describer herein.

Clock 110 includes an interface 111, a communication device 112, a processor 113, and a storage 114. Interface 111 may couple the clock 110 to the communication network 120 and/or the client system 140 using one or more wired and/or wireless connections. As such, the interface 111 enables the clock 110 to receive information from a data source.

Communication device 112 may include one or more wired and/or wireless communication devices. For example, communication device 112 may include a telephony modem, a cable modem, a wireless modem, a wired network card, and/or a wireless network card. The communication device 112 may be internal or external to clock 110.

Processor 113 includes a central processing unit (CPU) that processes machine-executable instructions that enable the functions of clock 110. In conjunction with the machine-executable instructions, processor 113 processes data exchanged with other sources, including controlling access to the data source over the communication network, and enabling the display of data received from the data source and the playing of audio signals.

Storage 114 may include both non-volatile and volatile storage. Storage 114 may be used to store machine-executable instructions, data, and various programs such as an operating system and one or more application programs, all of which may be processed by processor 113. For instance, non-volatile storage devices include, for example, a floppy disk drive, a hard disk drive, a flash memory, a compact disk-read only memory (CD-ROM), a digital versatile disc-read only memory (DVD-ROM), and a complementary metal-oxide semiconductor (CMOS) memory with battery backup. Volatile storage examples include the various types of random access memory (RAM), such as static RAM (SRAM) and dynamic RAM (DRAM).

Examples of application programs include authoring applications (e.g., word processing programs, database programs, spreadsheet programs, or graphics programs) capable of generating documents or other electronic content; client applications (e.g., America Online (AOL) client, CompuServe client, AOL instant messenger (AIM) client, AOL television (TV) client, or internet service provider (ISP) client) capable of communicating with other computer users, accessing various computer resources, and viewing, creating, or otherwise manipulating electronic content; and browser applications (e.g., Netscape's Navigator or Microsoft's Internet Explorer) capable of rendering standard Internet content.

In one exemplary implementation, storage 114 includes an application program that has instructions to enable clock 110 to request and access content from data source 130. The application program may include instructions that direct the request to base the content from the data source 130 on a user profile 135. The application program also may include instructions to receive the requested content from data source 130.

Communication links 115 and 125 may include communication pathways that enable communications through the one or more communication networks 120 described below. Each of the communication links 115 and 125 may include, for example, a wired, wireless, cable or satellite communication pathway.

The communication network 120 may include a delivery network that is capable of making a direct or indirect communication between the client system clock 110 and client system 140 and the data source 130, irrespective of physical separation. Examples of a delivery network include the Internet, the World Wide Web, wide area networks (WANs), local area networks (LANs), analog or digital wired and wireless telephone networks (e.g. public switched telephone network (PSTN), integrated services digital network (ISDN), and digital subscriber line (xDSL)), radio, television, cable, satellite, and/or any other delivery mechanism for carrying data.

Client system 140 typically includes one or more client devices and/or client controllers. For example, the client system 140 may include one or more general-purpose computers (e.g., personal computers), one or more special-purpose computers (e.g., devices specifically programmed to communicate with each other and/or the client system 140 and other external communication systems), or a combination of one or more general-purpose computers and one or more special-purpose computers. The client system 140 may be arranged to operate within or in concert with one or more other systems, such as, for example, one or more LANs and/or one or more WANs.

The client devices and the client controllers that may be included as part of the client system 140 typically each include one or more hardware components and/or software components. An example of a client device is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. The client device may include devices that are capable of peer-to-peer communications. An example of a client controller is a software application loaded on the client device for commanding and directing communications enabled by the client device. Other examples include a program, a piece of code, an instruction, a device, a computer, a computer system, or a combination thereof, for independently or collectively instructing the client device to interact and operate as described. The client controller may be embodied permanently or temporarily in any type of machine, component, physical or virtual equipment, storage medium, or propagated signal capable of providing instructions to the client device or to other external systems.

In one implementation, clock 110 may be a part of or communicate with a client system 140 through communication link 145. Clock 110 and client system 140 may be arranged to communicate with each other as part of a wired LAN such as, for example, an Ethernet network, a telephone line network, a power line network, and/or a wireless LAN using one or more wireless networking standards such as, for example, Bluetooth, HomeRF, and the family of Institute of Electrical and Electronics Engineers (IEEE) 802.11 standards.

In one exemplary implementation, clock 110 may use the universal plug and play (UPnP) standard to announce its presence and automatically connect to other devices. For example, clock 110 may use the UPnP standard to automatically configure itself and connect to an existing network, such as client system 140. Use of the UPnP standard makes it simpler for users to operate the clock 110. In response to the user connecting the clock 110 to a power source, the clock 110 may configure itself and connect to an existing device that the user has in operation.

Data source 130 may include one or more sources of information that may be accessed and downloaded to clock 110. Data source 130 may include one or more hardware components and/or one or more software components. Data source 130 may reside on one or more computing devices, such as a general-purpose computer (e.g., a personal computer) capable of responding to and executing instructions in a defined manner, a special-purpose computer, a workstation, a server, a device, a component, other physical or virtual equipment or some combination thereof capable of responding to and executing instructions.

In one implementation, data source 130 includes multiple web servers that store content and make the content available to other systems and devices on the network 120. For example, data source 130 may include one or more web servers that make information available that a clock radio user might find useful, such as, for instance, news, sports, weather, traffic conditions, business information (e.g., stock quotes), music, and other information.

To provide personalized information to a particular user identity, clock 110 may be associated with a particular user identity profile 135. Associating clock 110 with a particular user identity profile 135 may be accomplished in any number of different ways. In one exemplary implementation, clock 110 may prompt the user identity for information to identify an associated user profile, such as, a user name, screen name, logon name, and/or a password. Clock 110 may store the information provided by the user identity and provide the user entered information to the data source 130 when requesting personalized information from the data source 130.

In another implementation, clock 110 may include a device identity that may include an alphanumeric string or other identifier for the clock 110. The user identity may be prompted to enter information that identifies an associate user profile and the device identity may be tied to that user profile information. A table of device identities and corresponding information that identifies a user profile may be maintained locally at the clock 110 and/or client system 140 and/or remotely at the data source 130 or otherwise. As part of a request for information from the data source 130, clock 110 and/or client system 140 may provide the device identity to the data source 130, which may perform a lookup to determine the appropriate user profile to access.

In another implementation, request for information for the clock 110 may be performed by client system 140. As part of the clock 110 initialization process, the clock 110 may automatically communicate its device identity to the client system 140, which may bind the device identity to a user profile associated with the client system 140. The client system 140 then may communicate the device identity and user profile information to the data source 130.

Once the clock 110 is associated with a particular user identity profile 135, the user does not need to enter identifying information to obtain the personalized information from the data source 130.

The information made available by data source 130 to clock 110 may be tailored to a particular clock user identity using information contained about the user identity in user profile 135. The information about the user identity contained in the user profile 135 may include information that was previously obtained about the user identity that was created for a purpose other than for use with a clock 110. For example, the information in the user profile 135 may include information that was obtained about the user identity during the subscription process for services from an online service provider or an Internet service provider (ISP). Such information may include demographic information about the user identity including, for example, a user identity's name, billing address, electronic mail (e-mail) address, phone number, gender, date of birth, and other demographic information.

In another implementation, the information in the user profile 135 may include information that was obtained about the user identity during an online purchasing transaction and/or information that was obtained based on monitoring user interactions over the communication network, such as user browsing and purchasing habits.

In one implementation, the user profile 135 may be coupled directly to data source 130 through communication link 147. Communication link 147 may include a wired and/or wireless connection and may have attributes similar to communication links 115, 125, and 145, as described above. Additionally or alternatively, the user profile 135 may be coupled to the network 120 and the data source 130 may access information contained in the user profile 135 through communication links 125 and network 120.

Clock 110 may be programmed to access the data source 130 at a time designated by the user identity. For example, the user identity may set a time for the clock 110 to access information from the data source 130 (e.g., traffic information and weather information) just prior to waking up in the morning. The user identity also may set a time to sound an alarm on the clock 110 to wake-up. At the designated time, the clock 110 accesses the data source 130 which provides the requested information to the clock 110. The information provided from the data source 130 is based on the user profile 135 so that the user identity receives the geographically relevant traffic and weather information. Because the user profile 135 contains demographic data about the user identity, including demographic data that indicates the user identity's geographic location, the data source 130 is able to use the user profile information to provide the geographically relevant information to the user identity at the designated time.

Figure 2:
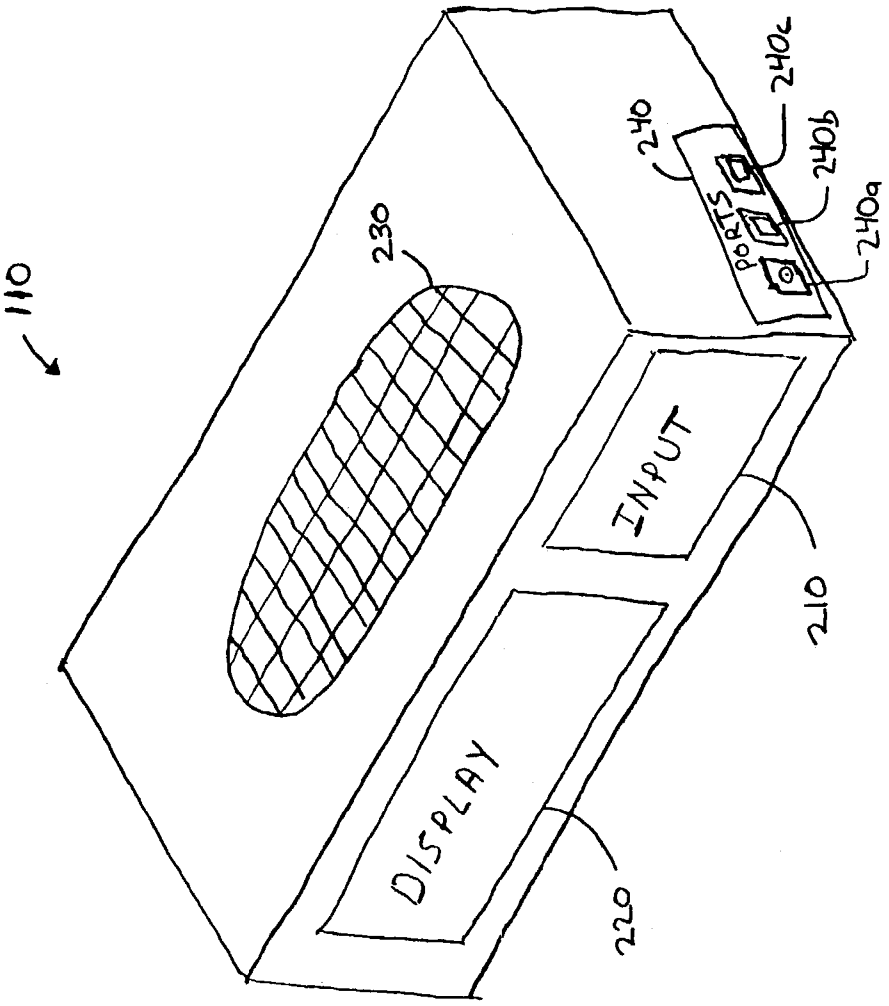
FIG. 2 is an isometric view illustrating an exemplary content-based alarm clock.

Referring to FIG. 2, an isometric view of an exemplary implementation of clock 110 is illustrated. Clock 110 includes an input module 210, a display module 220, a speaker module 230, and a port module 240. Input module 210 enables a user of the clock 110 to input data to the clock 110 and to interact with any application programs stored in clock 110 as instructed by processor 113 of FIG. 1. Input module 210 may include one or more devices to provide input to clock 110. For example, input module 210 may include a keypad with alphanumeric characters, one or more buttons, one or more dials, one or more knobs, and one or more programmable keys. Input module 210 may include a toggle (not shown), enabling a user to toggle between different screens or options available on the display module 220. Input module 210 may include one or more buttons to set a time value and to set an alarm condition for clock 110. Input module 210 may include a switch for turning the power to the clock 110 on and off.

In one implementation, input module 210 includes a microphone (not shown) for receiving voice commands that may control one or more functions of the clock 110. An application program may include instructions for recognizing and processing the voice commands to perform the desired functions. For example, voice commands may be used to perform different functions of the clock 110 such as setting a time value, setting an alarm condition, and operating a radio tuner. Voice commands also may be used to initiate the accessing and downloading process of personalized information from the data source 130.

The display module 220 provides a display of information to the user that may include a display of video content downloaded and received from external sources, such as data source 130 of FIG. 1, as instructed by processor 113 of FIG. 1. The display module 220 may include a liquid crystal display (LCD), a light-emitting diode (LED) display, or other type of display or combination of displays. The display module 220 may display a graphical user interface (GUI) that provides a visual display of user interactions with the clock 110. The display module 220 also may function as an input device by including a touch screen that enables the user to provide touch screen inputs to the clock 110 using the display module 220.

The speaker module 230 receives processed audio signals and outputs sound for the user based on the received audio signals, as instructed by processor 113 of FIG. 1. The port module 240 includes one or more ports that may be included as part of the communication devices 112 of FIG. 1. For example, port module 240 may include a cable port 240*a*, a network port 240*b* (e.g., an Ethernet port), and a telephony port 240*c*. Other ports and connection types also may be used.

Figure 3:
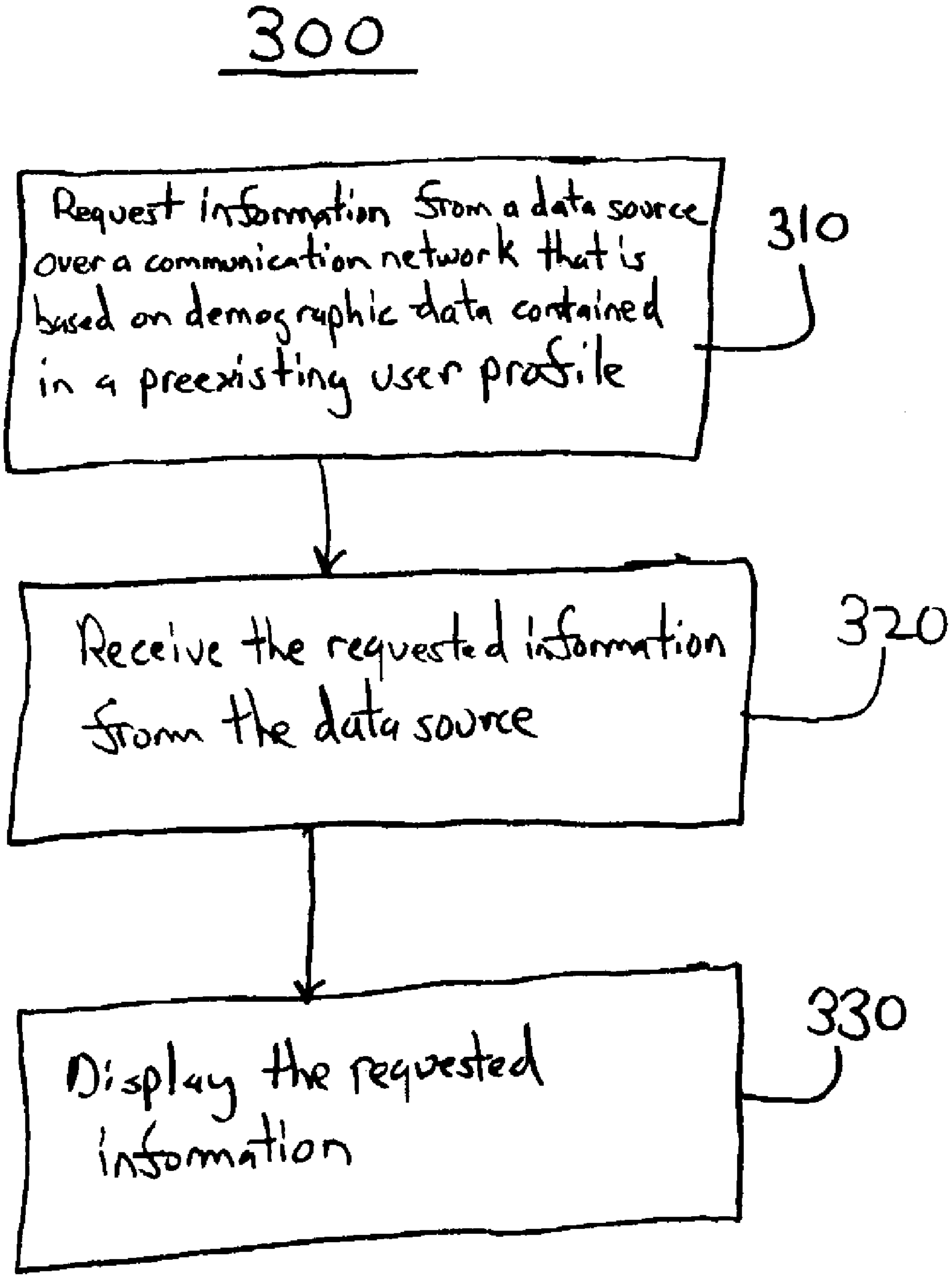
FIG. 3 is a flow chart illustrating an exemplary process for obtaining content at an alarm clock.

FIG. 3 illustrates an exemplary process 300 for receiving content from a data source at a clock. Process 300 includes requesting information from a data source over a communication network that is based on demographic data for a user identity contained in a preexisting user profile (step 310). The preexisting user profile may have been created and maintained for a purpose other than to use with the clock, such as, for example as a part of a subscription to an online service. The requested information is received from the data source (step 320) and the requested information is displayed (step 330).

Process 300 further includes designating a time by an alarm clock user to receive the information from the data source. The information received may include an audio signal that may play at the alarm clock device. For example, the alarm clock device may request traffic information from the data source (e.g., a traffic website on a web server) and the data source may provide geographically relevant traffic information based on the demographic data contained in that user's user profile. The traffic information may be provided in one or more formats. For example, the traffic information may be provided in a display format that may be displayed on the alarm clock device. Additionally or alternatively, the traffic information may be provided in an audio signal format that may be played on the alarm clock device.

Figure 4:
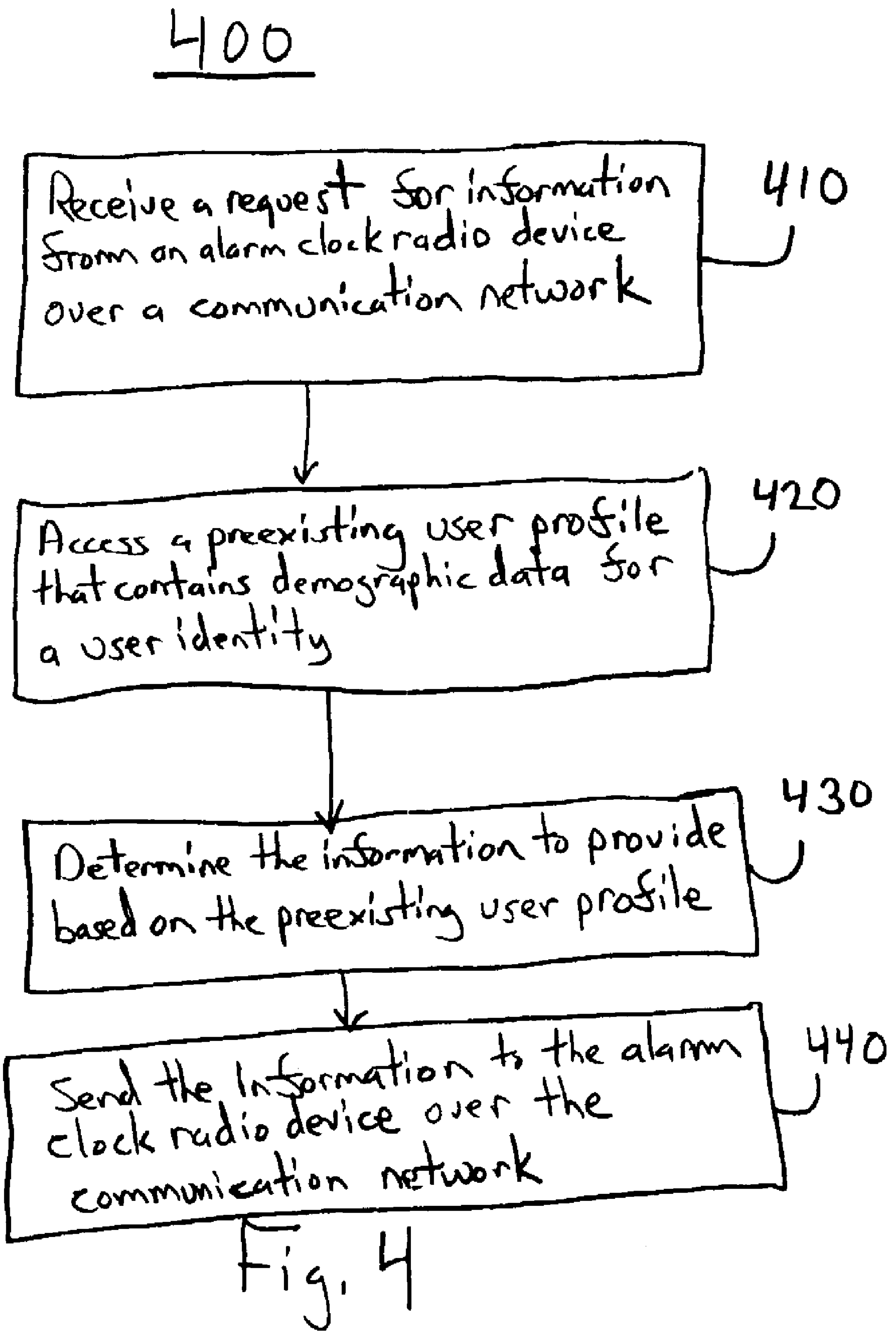
FIG. 4 is a flow chart illustrating an exemplary process for sending content to an alarm clock.

Referring to FIG. 4, a process 400 for sending the information from a data source to the alarm clock device includes receiving a request for information from the alarm clock device over a communication network (step 410). A preexisting user profile that contains demographic data for a user identity is accessed (step 420). The data source determines the information to provide to the alarm clock device based on the demographic data contained in the user profile (step 430). The information is then sent to the alarm clock device over the communication network (step 440).

Figure 5:
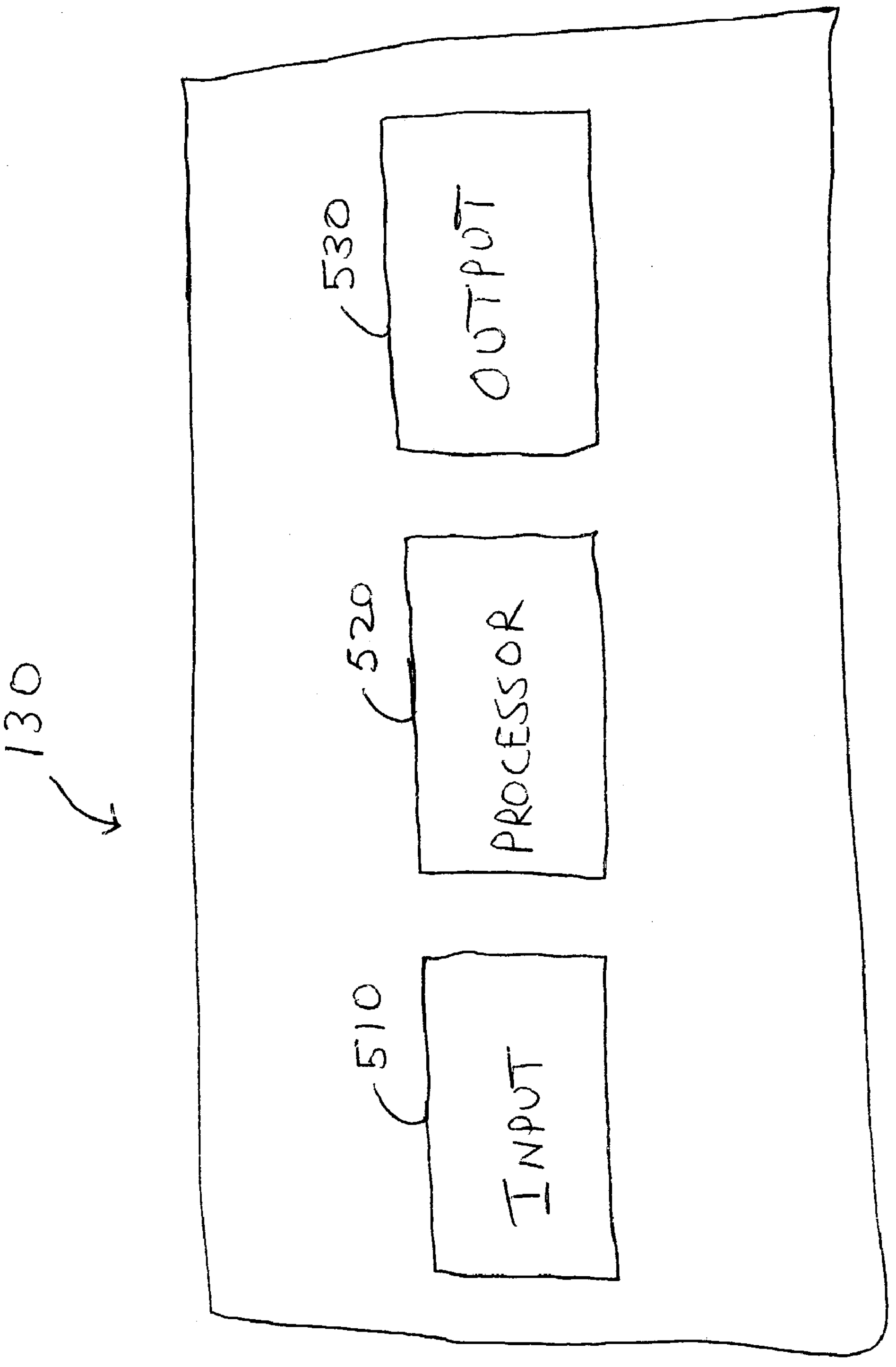
FIG. 5 is a block diagram illustrating an exemplary data source.

Referring to FIG. 5, a data source 130 includes an input module 510, a processor module 520, and an output module 530. The input module 510 may be structured and arranged to receive a request for information from an alarm clock device over a communication network, such as communication network 120 of FIG. 1. The request for information typically includes an identifier to enable the alarm clock device to be associated with a preexisting user identity profile.

The processor module 520 may be structured and arranged to enable the preexisting user identity profile that contains demographic data for the user identity to be accessed. The user identity profile typically contains information that was previously created and maintained for a purpose other than to use with the alarm clock. The processor module 520 determines the personalized information to provide to the alarm clock device based on the demographic data contained in the preexisting user identity profile.

The output module 530 may be structured and arranged to enable the data source to communicate the personalized information over the communication network to the alarm clock device in response to the request received from the alarm clock device.

The described systems, methods, and techniques may be implemented in digital and/or analog electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

Moreover, the described systems, methods, and techniques enable the functionality of a general purpose PC or search tool (e.g., a browser application) without requiring an introduction of additional or unfamiliar hardware, or a modification of user habit or experiences otherwise.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method for receiving personalized information at an alarm clock device, the method comprising:

enabling the alarm clock device to announce alarm clock presence perceivable by a client device that is proximate to the alarm clock device;

enabling the alarm clock device to interface with the client device;

automatically transmitting a device identifier of the alarm clock device from the alarm clock device to the client device;

associating, at the client device, the device identifier of the alarm clock device with a profile identifier for a user identity profile associated with the client device, wherein the user identity profile has previously been established for purposes other than for configuration of the alarm clock device;

transmitting the device identifier of the alarm clock and the profile identifier from the client device to a data source remote to the alarm clock;

receiving, at the alarm clock device, information from the data source that is personalized to the user identity profile associated with the client device.

2. The method as in claim 1 further comprising establishing the user-defined alarm criteria for the alarm clock device.

3. The method as in claim 1 wherein receiving the personalized information includes receiving the personalized information based on only the submission of the profile identifier upon or before satisfaction of the user-defined alarm criteria.

4. The method as in claim 1 wherein the personalized information is received without the user identity having to configure the user identity profile for the purpose of configuring the alarm clock device.

5. The method as in claim 1 wherein establishing the user-defined alarm criteria includes designating a time value to submit the profile identifier.

6. The method as in claim 1 wherein the alarm clock device is a special purpose computer configured to provide alarm clock services including alarm capabilities and audible or visual display of personalized news, weather, and entertainment information.

7. The method as in claim 1 wherein receiving the personalized information includes receiving weather information that is personalized for the user identity based on demographic data contained in the user identity profile.

8. The method as in claim 1 wherein receiving the personalized information includes receiving traffic information that is personalized for the user identity based on demographic data contained in the user identity profile.

9. The method as in claim 1 wherein receiving the personalized information includes receiving news information that is personalized for the user identity based on demographic data contained in the user identity profile.

10. One or more computer-readable mediums storing one or more computer programs for receiving personalized information at an alarm clock device, comprising:

an interfacing code segment that:

enables the alarm clock device to announce alarm clock presence perceivable by a client device proximate to the alarm clock device, enables the alarm clock device to interface with the client device, automatically transmits a device identifier of the alarm clock device from the alarm clock device to the client device;

an association code segment that causes the client device to associate the device identifier of the alarm clock device with a profile identifier for a user identity profile associated with the client device, wherein the user identity profile has previously been established for purposes other than for configuration of the alarm clock device;

a transmitting code segment that causes the client device to transmit the device identifier of the alarm clock and the profile identifier from the client device to a data source remote to the alarm clock, and a receiving code segment that causes the alarm clock device to receive information from the data source that is personalized to the user identity profile associated with the client device.

11. The computer readable-medium of claim 10 further comprising an establishing code segment that causes the alarm clock device to establish the user-defined alarm criteria for the alarm clock device.

12. The computer readable-medium of claim 10 wherein the receiving code segment causes the alarm clock device to receive the personalized information based on only the submission of the profile identifier upon or before satisfaction of the user-defined alarm criteria.

13. The computer readable-medium of claim 10 wherein the personalized information is received without the user identity having to configure the user identity profile for the purpose of configuring the alarm clock device.

14. The computer readable-medium of claim 10 wherein the establishing code segment causes the alarm clock device to designate a time value to submit the profile identifier.

15. The computer readable-medium of claim 10 wherein the alarm clock device is a special purpose computer configured to provide alarm clock services including alarm capabilities and audible or visual display of personalized news, weather, and entertainment information.

16. The computer readable-medium of claim 10 wherein the receiving code segment causes the alarm clock device to receive weather information that is personalized for the user identity based on demographic data contained in the user identity profile.

17. The computer readable-medium of claim 10 wherein the receiving code segment causes the alarm clock device to receive traffic information that is personalized for the user identity based on demographic data contained in the user identity profile.

18. The computer readable-medium of claim 10 wherein the receiving code segment causes the alarm clock device to receive news information that is personalized for the user identity based on demographic data contained in the user identity profile.

19. A system for receiving personalized information at an alarm clock device, comprising:

means for enabling the alarm clock device to announce alarm clock presence perceivable by a client device proximate to the alarm clock device;

means for enabling the alarm clock device to interface with the client device;

means for automatically transmitting a device identifier of the alarm clock device from the alarm clock device to the client device;

means for associating, at the client device, the device identifier of the alarm clock device with a profile identifier for a user identity profile associated with the client device, wherein the user identity profile has previously been established for purposes other than for configuration of the alarm clock device;

means for transmitting the device identifier of the alarm clock and the profile identifier from the client device to a data source remote to the alarm clock;

means for receiving, at the alarm clock device, information from the data source that is personalized to the user identity profile associated with the client device.

* * * * *